(12) United States Patent
Cunha et al.

(10) Patent No.: US 8,434,340 B2
(45) Date of Patent: May 7, 2013

(54) METHOD FOR FORMING A STAMPED METAL PART

(75) Inventors: Eugenio Ferreira Cunha, San Paolo (BR); Emira Meka, Sterling Heights, MI (US); James Bernabe, Southington, CT (US); Jason Sicotte, Bristol, CT (US)

(73) Assignee: Barnes Group, Inc., Bristol, CT (US)

( * ) Notice: Subject to any disclaimer, the term of this patent is extended or adjusted under 35 U.S.C. 154(b) by 692 days.

(21) Appl. No.: 12/642,262

(22) Filed: Dec. 18, 2009

(65) Prior Publication Data

US 2010/0154504 A1  Jun. 24, 2010

(51) Int. Cl.
| | |
|---|---|
| *B21D 28/00* | (2006.01) |
| *B21D 37/16* | (2006.01) |
| *B21D 31/00* | (2006.01) |
| *B21B 45/00* | (2006.01) |
| *B21C 23/24* | (2006.01) |

(52) U.S. Cl.
USPC ............... 72/336; 72/342.5; 72/342.2; 72/46; 72/364

(58) Field of Classification Search .............. 72/329, 72/330, 336, 337, 342.2, 342.5, 46, 47
See application file for complete search history.

(56) References Cited

U.S. PATENT DOCUMENTS

| | | | | |
|---|---|---|---|---|
| 3,247,946 | A * | 4/1966 | Klein | 148/530 |
| 5,083,449 | A * | 1/1992 | Kobayashi et al. | 72/349 |
| 5,144,709 | A * | 9/1992 | Rooney | 72/335 |
| 5,741,559 | A * | 4/1998 | Dulaney | 427/554 |
| 7,178,375 | B2 * | 2/2007 | Badour | 72/336 |
| 7,643,967 | B2 * | 1/2010 | Durney et al. | 703/1 |
| 2005/0126110 | A1 * | 6/2005 | Durney et al. | 52/720.1 |
| 2006/0117825 | A1 * | 6/2006 | Pfaffmann et al. | 72/60 |
| 2008/0105023 | A1 * | 5/2008 | Golovashchenko et al. | 72/364 |
| 2008/0105341 | A1 * | 5/2008 | Huff et al. | 148/622 |
| 2008/0250656 | A1 * | 10/2008 | Lewis | 30/356 |

OTHER PUBLICATIONS

26th Edition Marchinery's Handbook, 26th Edition, copyright 2000, p. 703.*
Surface Roughness Measurement, Practical Tips for laboratory and workshop, Bulletin No. 1984, Mitutoyo.

* cited by examiner

*Primary Examiner* — Dana Ross
*Assistant Examiner* — Lawrence Averick
(74) *Attorney, Agent, or Firm* — Fay Sharpe LLP

(57) ABSTRACT

An improved stamped metal part and method for making the same.

19 Claims, 3 Drawing Sheets

METHOD FOR FORMING A STAMPED METAL PART

The present invention is directed to a method for manufacturing a stamped metal part, and more particularly spring flexure parts. The method of the present invention is used to form stamped metal parts having improved properties and/or extended life.

BACKGROUND OF THE INVENTION

Spring flexure parts such as converter flexures and displacer flexures are components that are commonly used in compressors, Stirling cycle engines, heat pumps and the like. In particular, converter flexures and displacer flexures are commonly used as internally mounted flexure bearing assemblies for coaxial non-rotating linear reciprocation, and are typically used in power conversion machinery; however, converter flexures and displacer flexures can have other or alternative uses and/or be used in other or alternative industries. Non-limiting examples of the use of converter flexures and displacer flexures are illustrated in U.S. Pat. Nos. 5,522,214; 5,906,218 and 5,920,133, which are incorporated herein by reference. Converter flexures and displacer flexures are commonly subjected in use to extended periods of cyclical operation. As such, the continuous reciprocation of the converter flexures and displacer flexures ultimately results in damage and breakage of the converter flexure and displacer flexure, thus requiring periodic maintenance, replacement and repair of the converter flexure and/or displacer flexure and the machine that includes the converter flexure and/or displacer flexure. Consequently there is a continuous need to improve the life of the converter flexure and displacer flexure so as to reduce downtime and maintenance costs associated with machines that include converter flexures and/or displacer flexures.

SUMMARY OF THE INVENTION

The present invention is directed to a method for manufacturing a stamped metal part to form a stamped metal part having improved properties and/or to extend the usable life of the stamped metal part. In one non-limiting aspect of the present invention, the method for manufacturing a stamped metal part can be used to form stamped metal parts such as, but not limited to, spring flexure parts such as, but not limited to, converter flexures and/or a displacer flexures that have a necessary flatness for assembly and a cycle life in excess of 1 billion cycles. In one non-limiting embodiment of the invention, the method for manufacturing stamped metal parts can be used to form stamped metal parts that have a necessary flatness for assembly and a cycle life in excess of 5 billion cycles. In another and/or alternative non-limiting embodiment of the invention, the method for manufacturing stamped metal parts can be used to form stamped metal parts that have a necessary flatness for assembly and a cycle life in excess of 10 billion cycles. In still another and/or alternative non-limiting embodiment of the invention, the method for manufacturing stamped metal parts can be used to form stamped metal parts that have a necessary flatness for assembly and a cycle life so as to provide at least 1 year maintenance free performance for the stamped metal parts. In yet another and/or alternative non-limiting embodiment of the invention, the method for manufacturing stamped metal parts can be used to form stamped metal parts that have a necessary flatness for assembly and a cycle life so as to provide at least 5 years maintenance free performance for the stamped metal parts. In still yet another and/or alternative non-limiting embodiment of the invention, the method for manufacturing stamped metal parts can be used to form stamped metal parts that have a necessary flatness for assembly and a cycle life so as to provide at least 10 years maintenance free performance for the stamped metal parts. In another and/or alternative non-limiting embodiment of the invention, the method for manufacturing stamped metal parts can be used to form stamped metal parts that have a necessary flatness for assembly and a cycle life so as to provide at least 20 years maintenance free performance for stamped metal parts.

In another and/or alternative non-limiting aspect of the present invention, the method for manufacturing stamped metal parts includes one or more of the following method steps, namely 1) a metal blanking process (e.g., Clean Edge Blanking, etc.), 2) a heat treatment process (e.g., Specialized Heat Treatment, etc.), 3) a finishing process (e.g., ISO-finishing, CBF, etc.), and/or 4) a stress and/or hardening modification process (e.g., Specialized Peening process, etc.). In accordance with one non-limiting embodiment of the invention, the process and method for forming stamped metal parts in accordance with the present invention involves the use of steps 1 and 4 as set forth above. In accordance with another non-limiting embodiment of the invention, the process and method for forming stamped metal parts in accordance with the present invention involves the use of steps 1 and 3 as set forth above. In accordance with still another non-limiting embodiment of the invention, the process and method for forming stamped metal parts in accordance with the present invention involves the use of steps 1, 3 and 4 as set forth above. In accordance with yet another non-limiting embodiment of the invention, the process and method for forming stamped metal parts in accordance with the present invention involves the use of steps 1, 2 and 3 as set forth above. In accordance with still yet another non-limiting embodiment of the invention, the process and method for forming stamped metal parts in accordance with the present invention involves the use of steps 1-4 as set forth above.

The process step of metal blanking (e.g., Clean Edge Blanking, etc.) is a metal stamping process used to improve the performance of highly stressed stamped parts such as, but not limited to, a converter flexure and/or a displacer flexure. The metal blanking process typically includes the use of high performance, tight tolerance dies (e.g., carbide, CPM10V, etc.) with a specialized tool design to minimize edge breaking. The metal blanking process is designed to reduce the number of possible fatigue failure initiation sites. The metal blanking process results in a more precise blanking process that produces a part edge with less fractured structure, better burr control, more straight edges, and improved flatness of the stamped metal part. By producing stamped metal parts with less fractured structure, better burr control, better straight edges, and improved flatness, the usable life of the stamped metal parts can be increased. The metal blanking process is designed to minimize, but generally does not completely eliminate, fatigue failure initiation sites (e.g., burrs, fractured structured or cracks, non-straight edges, bent regions or stress risers, etc.). In another non-limiting embodiment of the invention, the stamped metal parts include, after the metal blanking process, less than about 5% edge breaking or fractured structure, typically less than about 2% edge breaking or fractured structure, more typically less than about 1% edge breaking or fractured structure, and even more typically less than about 0.5% edge breaking or fractured structure. In still another non-limiting embodiment of the invention, the stamped metal parts include, after the metal blanking process, at least about 0.0001% edge breaking or fractured structure, typically at least about 0.001% edge breaking or fractured structure, more typically at least about 0.01% edge breaking or fractured structure, and even more typically at least about 0.1% edge breaking or fractured structure. The metal blanking process typically includes the use of precision tooling formed by tight tolerances during the tooling manufacturing process. Generally the tooling is at least partially formed of high quality raw material (e.g., carbide, CPM10V, etc.). The stamped metal part formed by the metal blanking process is generally within size tolerances of about 3 mm, typically within about 2 mm, more typically within about 1 mm, and even more typically within about 0.5 mm. The metal blanking process includes the stamping high-tensile, pre-tempered material to create a part having maximum edge condition with minimal shear and controlled breakage. As can be appreciated, the metal blanking process can be used on pre-hardened material. The metal blanking process generally reduces stress risers (e.g., bending or warping of part, non-flat regions of part, etc.) on the blanked edge, thus increasing fatigue life of the formed stamped metal parts. In another non-limiting embodiment of the invention, the stamped metal parts include, after the metal blanking process, less than about 5% stress risers, typically less than about 2% stress risers, more typically less than about 1% stress risers, and even more typically less than about 0.5% stress risers. In still another non-limiting embodiment of the invention, the stamped metal parts include, after the metal blanking process, at least about 0.0001% stress risers, typically at least about 0.001% stress risers, more typically at least about 0.01% stress risers, and even more typically at least about 0.1% stress risers. In yet another non-limiting embodiment of the invention, the stamped metal parts include, after the metal blanking process, less than about 5% burrs, typically less than about 2% burrs, more typically less than about 1% burrs, and even more typically less than about 0.5% burrs. In still yet another non-limiting embodiment of the invention, the stamped metal parts include, after the metal blanking process, at least about 0.0001% burrs, typically at least about 0.001% burrs, more typically at least about 0.01% burrs, and even more typically at least about 0.1% burrs. In yet another non-limiting embodiment of the invention, the stamped metal parts, after the metal blanking process, have a top and bottom surface that lie in a parallel flat plane to one another and that at least about 90% of the top and bottom surfaces lie in such parallel flat planes to form a flat stamped metal part, typically at least about 95% of the top and bottom surfaces lie in such parallel flat planes to form a flat stamped metal part, more typically at least about 98% of the top and bottom surfaces lie in such parallel flat planes to form a flat stamped metal part, even more typically at least about 99% of the top and bottom surfaces lie in such parallel flat planes to form a flat stamped metal parts and still even more typically at least about 99.5% of the top and bottom surfaces lie in such parallel flat planes to form a flat stamped metal part. In yet another non-limiting embodiment of the invention, the stamped metal part does not have a deviation from the flat plane of the stamped metal part or does not have a height difference of more than about 0.05 inches, and typically does not have a deviation from the flat plane of the stamped metal part or does not have a height difference of more than about 0.01 inches, and more typically does not have a deviation from the flat plane of the stamped metal part or does not have a height difference of more than about 0.008 inches, and still more typically does not have a deviation from the flat plane of the stamped metal part or does not have a height difference of more than about 0.005 inches. For example, if the stamped metal part thickness is 0.039 inches, and the maximum height deviation allowed is 0.008 inches, then the maximum height of the stamped metal part when resting on a flat surface is no more than 0.047 inches. Generally, the maximum amount of bending of the stamped metal part relative to the thickness of the stamped metal part is less than 50%, typically less than about 40%, more typically less than about 30%, even typically less than about 25%, still even more typically less than about 20%, and still yet even more typically less than about 15%. For example, if the stamped metal part thickness was 0.039 inches prior to the stamping process, and the maximum height deviation of the stamped metal part is about 0.008 inches (i.e., the maximum height of the stamped metal part when resting on a flat surface is about 0.047 inches), then the maximum amount of bending of such stamped metal part relative to the thickness of the stamped metal part is 0.008/0.039 or about 20.51%. These flatness parameters are generally maintained for each process step of the stamped metal part; however, the amount of flatness of the stamped metal part may vary after each process step as the stamped metal part is processed by different process steps.

The process of heat treating (e.g., Specialized Heat Treatment, etc.) is designed to harden the stamped metal part that is formed by the metal blanking process. Generally, the heat treatment process heats and hardens stamped metal parts in a vacuum; however, this is not required. The heat treatment process is an optional process if the material that is stamped in the metal blanking process is a pre-hardened metal material. The heat treatment process generally includes the step of applying one or more coatings to the stamped metal parts; however, this is not required. The coating of the stamped metal parts prior to heating and hardening the stamped metal part has been found to reduce or prevent the stamped metal part after heating and hardening from sticking or bonding to other stamped metal parts and/or to the heating surface during the heating and hardening process. The sticking or bonding of a stamped metal part to another stamped metal part and/or the heating surface can result in the bending and/or otherwise damaging of the hardened stamped metal part when separated from another stamped metal part and/or from the heating surface. Different types of coating materials can be used. Non-limiting materials include, but are not limited to, magnesium, magnesium compounds, silica compounds and/or the like. The stamped metal parts during the heating and hardening process that have a thin thickness are generally held in a fixture so as to inhibit or prevent the bending or warping of the stamped metal part during the heating and hardening process. It has been found that stamped metal parts having a thickness of less than about 0.2 inches may not maintain a desired flatness when heated and hardened. As such, the stamped metal parts can be placed in a fixture during the heat treatment process to reduce or prevent further bending or warping of the stamped metal part. In one non-limiting embodiment of the invention, the stamped metal parts that are placed in a fixture during the heating and hardening of the stamped metal parts are less than about 0.1 inches thick. In another non-limiting embodiment of the invention, the stamped metal parts that are placed in a fixture during the heating and hardening of the stamped metal parts are less than about 0.05 inches thick. In still another non-limiting embodiment of the invention, the stamped metal parts that are placed in a fixture during the heating and hardening of the stamped metal parts are less than about 0.04 inches thick. In yet another non-limiting embodiment of the invention, the stamped metal parts that are placed in a fixture during the heating and hardening of the stamped metal parts are less than about 0.03 inches thick. In still yet another non-limiting embodiment of the invention, the stamped metal parts that are placed in a fixture during the heating and hardening of the stamped metal parts are less than about 0.02 inches thick. In another non-limiting embodiment of the invention, the stamped metal parts that are placed in a fixture during the heating and hardening of the stamped metal parts are less than about 0.01 inches thick. The heat treatment process is designed to both harden the stamped metal part and minimize the warping or bending of the stamped metal part.

The process of heat treating can include one or more of the following five (5) steps:

Step 1—Optionally coating one or more of the stamped metal parts. Prior to the beginning of the heat treatment process, each of the stamped metal parts are generally coated with a material to inhibit or prevent the sticking together of one or more stamped metal parts during the heating and hardening process. The coating is generally a dry coating material that is applied to one or both sides of the stamped metal part. Non-limiting examples of dry coating materials that can be used include, but are not limited to, magnesium (Mg) and/or silicon-oxygen compound ($SiO_2$, silica). Generally the complete outer surface of the stamped metal parts is coated; however, this is not required. Generally, the stamped metal parts are coated when two or more of the stamped metal parts are to be stacked on one another during the heating and hardening process; however, this is not required.

Step 2—Optionally placing the stamped metal parts into a fixture. If the stamped metal parts are to be coated, such stamped metal parts are coated prior to positioning such parts in the fixture, if a fixture is to be used during the heating and hardening process. When the stamped metal parts are formed of a thin metal material, the stamped metal parts are typically placed in a fixture so as to minimize the bending or warping of the stamped metal part during the heating and hardening process. The stamped metal parts may or may not be stacked on one another when placed in the fixture. The fixture material is generally formed of a material that is different from the material used to form the stamped metal part; however, this is not required. The fixture material is generally formed of a material that expands less than the material used to form the stamped metal part at the temperatures that are to be used to heat and harden the stamped metal parts; however, this is not required. When the stamped metal parts are placed in a fixture, the stamped metal parts are generally placed in the fixture prior to heating the stamped metal parts to a first elevated temperature; however, this is not required.

Step 3—Ramping up the temperature of the stamped metal part from room temperature to a first elevated temperature. The type of steel to be heat treated will be an important factor in determining the temperature of the first elevated temperature. For stainless steel materials, the first elevated temperature is at least about 1200° F., typically at least about 1400° F., more typically about 1400-1650° F., even more typically about 1450-1600° F., and still even more typically about 1500-1550° F. Generally the first elevated temperature is about 30-90% of the annealing temperature of the material used to form the stamped metal part, typically about 40-75% of the annealing temperature of the material used to fog iii the stamped metal part, more typically about 50-70% of the annealing temperature of the material used to form the stamped metal part, and even more typically about 60-70% of the annealing temperature of the material used to form the stamped metal part. The time for ramping the temperature from room or ambient temperature (e.g., 70° F.) to the first elevated temperature is generally at least about 0.5 hours, typically at least about 1 hour, more typically about 1-5 hours, and even more typically about 1-2 hours. The time of ramping up to the first elevated temperature generally depends on the on the number of stamped metal parts to be heated and hardened and/or the number of stamped metal parts that are stacked on one another, if a plurality of stamped metal parts are stacked together. For instance, when a plurality of stamped metal parts are stacked together, it has been found that a longer time is required to properly heated the stacked stamped metal parts to the first elevated temperature as more parts are stacked together. The stamped metal part can be contained in an inert atmosphere (e.g., vacuum, nitrogen atmosphere, etc.) so as to control the atmosphere about the stamped metal part and to avoid corrosion of the stamped metal part during the heating of the stamped metal part to the first elevated temperature; however, this is not required. The first elevated temperature is generally less than the annealing temperature for the stamped metal part; however, this is not required.

Step 4—Ramping up the temperature from a first elevated temperature to a second elevated temperature. For stainless steel materials, the second elevated temperature is over about 1650° F., typically at least about 1750° F., more typically about 1750-2200° F., still more typically about 1800-2000° F., and still yet even more typically about 1850-1900° F., and then heating the stamped metal part at such second elevated temperature for at least about 0.25 hours, typically at least about 0.5 hours, more typically about 0.5-3 hours, and even more typically about 0.5-1.5 hours. Generally, the second elevated temperature is a sufficiently high temperature to anneal the stamped metal part; however, this is not required. Generally, the time period that the stamped metal part is maintained at the second elevated temperature is sufficient to properly anneal the stamped metal part; however, this is not required. The time of ramping up to the second elevated temperature generally depends on the on the number of stamped metal parts to be heated and hardened and/or the number of stamped metal parts that are stacked on one another, if a plurality of stamped metal parts are stacked together. For instance, when a plurality of stamped metal parts are stacked together, it has been found that a longer time is required to properly heated the stacked stamped metal parts to the second elevated temperature as more stamped metal parts are stacked together. The time for ramping the temperature from a first elevated temperature to the second elevated temperature is generally at least about 0.25 hours, typically about 0.25-2 hours, more typically about 0.5-1-5 hours, and even more typically about 0.5-1 hours. The stamped metal part can be contained in an inert atmosphere (e.g., vacuum, nitrogen atmosphere, etc.) so as to control the atmosphere about the stamped metal part and to avoid corrosion of the stamped metal part during the heating of the stamped metal part to the second elevated temperature; however, this is not required. The time period that the stamped metal part is maintained at a first elevated temperature prior to being heated to the second elevated temperature is generally about 0-1 hour and typically about 0-0.5 hours. When the material used to form the metal stamped part is carbon steel, the step of increasing the temperature to a first elevated temperature can be eliminated and the carbon steel can be directed heated from ambient or room temperature to the annealing temperature; however, this is not required. As is appreciated, the annealing temperature for carbon steel is lower than the annealing temperature of stainless steel (e.g., 30-60% lower).

Step 5—Cooling the heated stamped metal parts in Step 4 in an inert atmosphere (e.g., vacuum, nitrogen atmosphere, etc.) so as to control the atmosphere and to avoid corrosion of the stamped part during the cooling. Generally the heated stamped metal part is cooled to ambient temperature; however, this is not required. In one non-limiting aspect of the invention, the heated stamped metal part is cooled down to at least about 500° C. while being maintained in an inert atmosphere. In another non-limiting aspect of the invention, the heated stamped metal part is cooled down to at least about 100° C. while being maintained in an inert atmosphere. In still another non-limiting aspect of the invention, the heated stamped metal part is cooled down to at least about 70-80° C. while being maintained in an inert atmosphere. During the cooling step, the heated stamped metal part can be subjected to at a pressurized environment; however, this is not required. In one non-limiting aspect of the invention, the heated stamped metal part is cooled down while at least partially being maintained in a pressurized environment of at least about 1.5 bars. In another non-limiting aspect of the invention, the heated stamped metal part is cooled down while at least partially being maintained in a pressurized environment of at least about 2 bars. In still another non-limiting aspect of the invention, the heated stamped metal part is cooled down while at least partially being maintained in a pressurized environment of about 2-10 bars. In yet another non-limiting aspect of the invention, the heated stamped metal part is cooled down while at least partially being maintained in a pressurized environment of about 3-8 bars. In still yet another non-limiting aspect of the invention, the heated stamped metal part is cooled down while at least partially being maintained in a pressurized environment of about 3.5-6 bars. After the stamped metal part has been cooled, the stamped metal part is generally an annealed part; however, this is not required. Generally, the annealed stamped metal part that is formed of stainless steel has a hardness of at least about 45HRC@400° F., and typically about 49-53HRC@400° F. Fir carbon steel parts, the hardness is at least about 20HRC@400° F., and typically about 30-45HRC@400° F.

The process of a finishing (e.g., ISO-finishing, CBF, etc.) is designed to provide enhanced fatigue life to the stamped metal parts. The finishing process generally includes a deburring process. The finishing process is also designed to create a conditioned part edge that enhances the fatigue life and performance of the stamped metal part. The finishing process is generally applied to both sides of the stamped metal part; however, this is not required. Generally a rounded edge is formed on the stamped metal part by the a finishing process. The removal of sharp edges has been found to enhance the fatigue life and performance of the stamped metal part. In addition, the finishing process is designed to impart favorable residual compressive stresses to the stamped metal part. The finishing process is also designed to optimize the residual stress of the stamped metal part with the type of deburring, the cycle time, and the type of material used for the stamped metal part. The cycle time can vary from 1-60 hours depending on the part design and edge requirements. The finishing process can be used to induce a controlled magnitude of residual compressive stresses on the stamped metal part to increase the fatigue life of the stamped metal part. By using the finishing process, the stamped metal part can achieve at least about −70Ksi of residual compressive stresses, typically at least about −90 Ksi of residual compressive stresses, and more typically at least about −100Ksi of residual compressive stresses. The finishing process can create finished surfaces as smooth as no greater than about 0.75 Rz max., typically no greater than about 0.5 Rz max., more typically no greater than about 0.25 Rz max., and even more typically no greater than about 0.2 Rz max. The finishing process can create a random matte finish on the stamped metal part to reduce surface imperfections on the stamped metal part; however, this is not required. The finishing process can thus be used to eliminate stress-concentrating notches/burrs on the stamped metal part, symmetrically finish edges of the stamped metal part to remove stamping distortions, remove tensile stress from blanking operations, and/or prevent overfinishing of the stamped metal part.

The stress and/or hardening modification process (e.g., Specialized Peening process, etc.) is designed to increase the compressive stress of the stamped metal part, to relieve tensile stresses in the stamped metal part, and/or to encourage strain hardening of the stamped metal part. One non-limiting stress and/or hardening modification process that can be used is a peening process. The peening process can include masking one more portions of the stamped metal parts in fixtures and then providing localized peening primarily to the high stress areas of the part using shot (e.g., glass bead shot, etc.); however, this is not required. The stress and/or hardening modification process can be used to increase the compressive stress of the stamped metal part to at least about −110Ksi, and typically at least about −120Ksi. The stress and/or hardening modification process can also be used to relieve tensile stresses in the stamped metal part and/or to encourage strain hardening of the stamped metal part. When a peening process is used, a mask is generally used a mask to shield one or more portions of the stamped metal part from the shot; however, this is not required. The shot generally has a particle size of about 25-200 μm and can be formed of a variety of materials (e.g., fine steel, stainless steel, ceramic, glass, etc.).

It is one non-limiting object of the present invention to form a stamped metal part having improved life.

It is another non-limiting object of the present invention to form a stamped metal part by a process that includes 1) a metal blanking process (e.g., Clean Edge Blanking, etc.), 2) a heat treatment process (e.g., Specialized Heat Treatment, etc.), 3) a finishing process (e.g., ISO-finishing, CBF, etc.), and/or 4) a stress and/or hardening modification process (e.g., Specialized Peening process, etc.).

These and other objects and advantages will become apparent from the following description taken together with the accompanying drawing.

BRIEF DESCRIPTION OF DRAWINGS

Reference may now be made to the drawings, which illustrate various embodiments that the invention may take in physical form and in certain parts and arrangements of parts wherein.

DETAILED DESCRIPTION OF THE INVENTION

Figure 1:
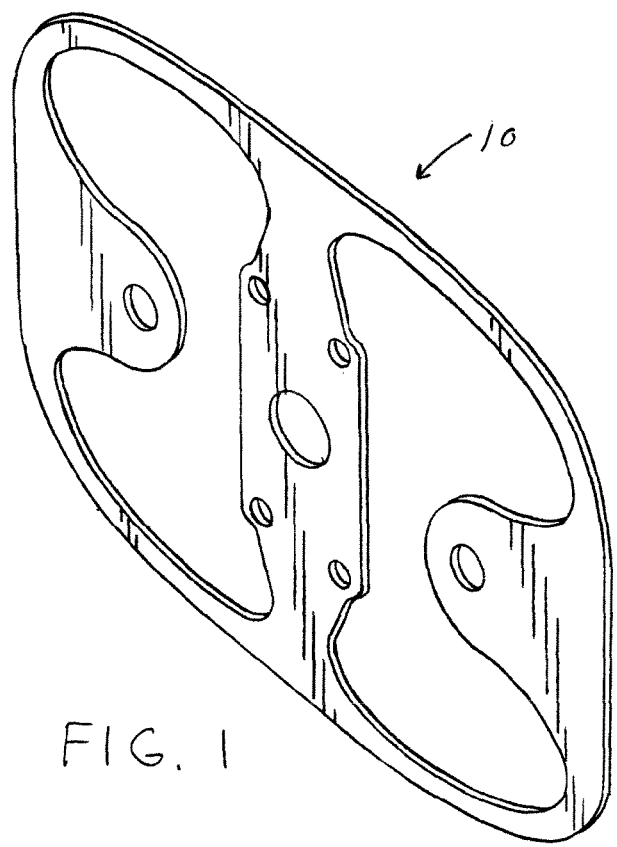
FIG. 1 is an elevation view of one non-limiting stamped metal part that can be formed by the method of the present invention.
Figure 2:
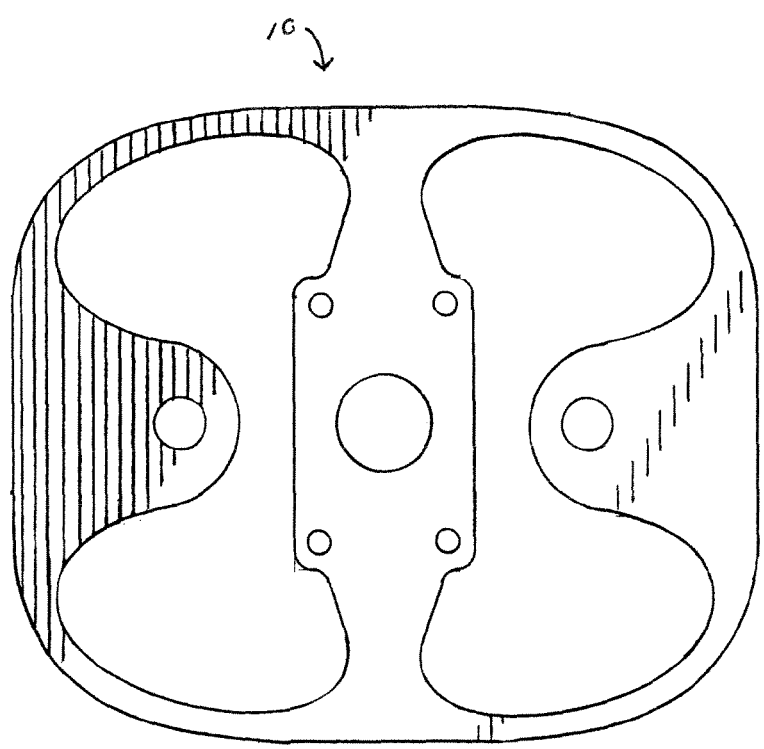
FIG. 2 is a top view of the stamped metal part of FIG. 1.
Figure 3:
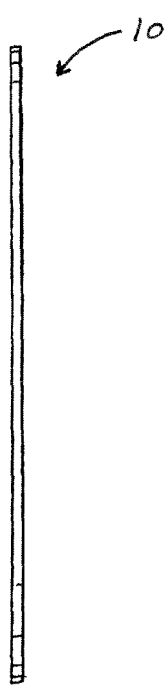
FIG. 3 is a side view of the stamped metal part of FIG. 1.
Figure 4:
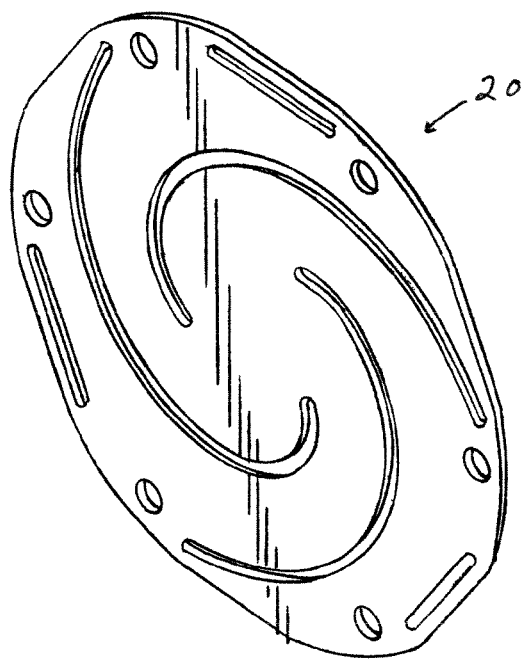
FIG. 4 is an elevation view of another non-limiting stamped metal part that can be formed by the method of the present invention.
Figure 5:
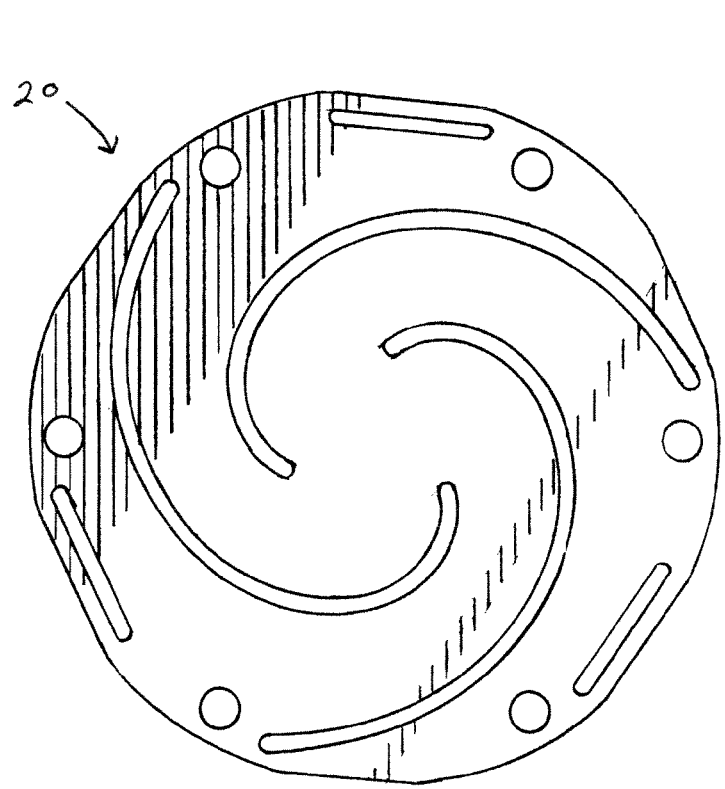
FIG. 5 is a top view of the stamped metal part of FIG. 4.
Figure 6:
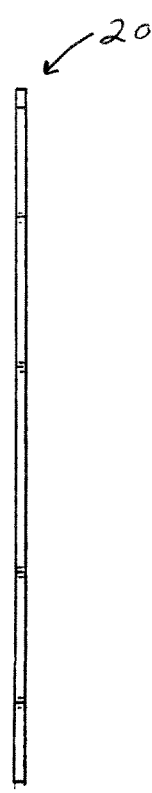
FIG. 6 is a side view of the stamped metal part of FIG. 4.

Referring now to the drawings wherein the showings are for the purpose of illustrating non-limiting embodiments of the invention only and not for the purpose of limiting same, FIGS. 1-6 illustrate two non-limiting metal stamped parts 10, 20 that can be manufactured by the method of the present invention. The metal stamped parts 10, 20 are non-limiting examples of flexure parts that can be used in various types of components. These metal stamped parts are generally flat parts and have a generally constant thickness as illustrated in FIGS. 3 and 6. In addition, these metal parts have movable components that are designed to flex and bend many times over the life of the stamped metal part. The present invention is directed to a method for forming a metal stamped part that improves the life of the metal stamped part.

Figure 7:
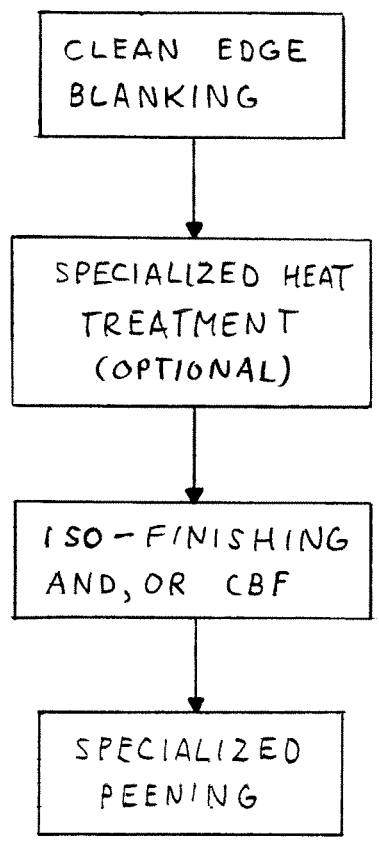
FIG. 7 is a flow chart of one non-limiting process for forming a stamped metal part in accordance with the present invention.

Referring now to FIG. 7, there is illustrated a non-limiting process of the present invention. The process of the present invention is designed to form a stamped metal part having improved properties and/or to extend the usable life of the stamped metal part. For example, the method for manufacturing stamped metal parts can be used to form stamped metal parts that have a necessary flatness for assembly and a cycle life in excess of one or more billion cycles and a cycle life so as to provide one or more years of maintenance free performance. The method for manufacturing stamped metal parts in accordance with the present invention includes one or more steps, namely 1) a metal blanking process, 2) a heat treatment process, 3) a finishing process, and/or 4) a stress and/or hardening modification process. Generally two or more of these steps are used in the manufacturing process of the present invention. In accordance with one non-limiting manufacturing process of the present invention, the manufacturing process involves the use of steps 1, 3 and 4 as set forth above. In accordance with another non-limiting manufacturing process of the present invention, the manufacturing process involves the use of steps 1-4 as set forth above.

Referring again to FIG. 7, the metal blanking process is a metal stamping process. The metal blanking process typically uses high performance, tight tolerance dies (e.g., carbide dies, vanadium alloy dies, etc.) with a specialized tool design to minimize edge breaking of the stamped metal parts. The metal blanking process of the present invention is designed to reduce the number of possible fatigue failure initiation sites on a stamped metal part (e.g., burrs, fractured structured or cracks, non-straight edges, bent regions or stress risers, etc.). The metal blanking process of the present invention is used to form a more precise metal stamped part having a part edge with less fractured structure, better burr control, more straight edges, and improved flatness. As illustrated in FIGS. 3 and 6, the stamped metal part is a generally flat part. The metal blanking process of the present invention is designed to maintain the flatness of the stamped metal part. Generally, the stamped metal part, after the metal blanking process, has top and bottom surfaces that lie in a parallel flat planes to one another and at least about 90% of the top and bottom surfaces lie in such parallel flat planes to form a flat stamped metal part. The stamped metal parts generally are thin parts having a thickness of no more than about 0.1 inches. When these metal parts are not cut in a certain manner, the stamped metal part can become overly bent, thus adversely affecting the flatness of the stamped metal part. The metal blanking process of the present invention is designed to limit such bending of the stamped metal part. Generally, the maximum amount of bending of the stamped metal part relative to the thickness of the stamped metal part is less than about 25%.

After the metal blanking process, the stamped metal part can be hardened. This process step can be eliminated if the metal sheet used in the metal blanking process is a pre-hardened metal sheet. It has been found that for very thin stamped metal parts, the tendency of the stamped metal part to be overly bent during the metal blanking process increases when a pre-hardened metal sheet is used. When a non-pre-hardened metal sheet is used during the metal blanking process, the stamped metal parts are typically hardened by a heat treatment process. The heat treatment process is designed to harden the stamped metal part that is formed by the metal blanking process. Generally, the heat treatment process heats and hardens stamped metal parts in a vacuum. In addition, the heat treatment process generally includes applying one or more coatings on the outer surface of the metal stamp part prior to heating and hardening the metal stamped part. The coating of the stamped metal parts prior to heating and hardening the metal stamped part is designed to prevent the stamped metal part from sticking or bonding to other stamped metal parts and/or to the heating surface during the heating and hardening process. Such sticking or bonding of a stamped metal part can result in the bending and/or otherwise damaging of the hardened stamped metal part when being separated from another stamped metal part and/or from the heating surface. One non-limiting material that can be used as the coating material includes magnesium metal, magnesium compounds and/or silicon compounds.

When the stamped metal parts have a small thickness, the stamped metal parts during the heating and hardening process have a tendency to bend or warp. It has been found that stamped metal parts having a thickness of less than about 0.2 inches may not maintain a desired flatness when heated and hardened. As such, the stamped metal parts can be placed in a fixture during the heating and hardening of the stamped metal parts to maintain the desired flatness of the stamped metal part during the heating and hardening process.

When the heating and hardening process is used, such process can include some or all of the following process steps:

Step 1—Optionally coating one or more of the stamped metal parts. Prior to the beginning of the heat treatment process, each of the stamped metal parts can be coated with a material to inhibit or prevent the sticking together of one or more stamped metal parts during the heating and hardening process. The coating is generally a dry coating material that is applied to one or both sides of the stamped metal part. Generally the complete outer surface of the stamped metal parts is coated.

Step 2—Optionally placing the stamped metal parts into a fixture. If the stamped metal parts are to be coated, such parts are generally coated prior to positioning such stamped metal parts in the fixture, if a fixture is to be used during the heating and hardening process. When the stamped metal parts are to be placed in a fixture, the stamped metal parts are generally placed in the fixture prior to heating the stamped metal parts to a first elevated temperature; however, this is not required.

Step 3—Ramping up the temperature of the stamped metal part from room temperature or ambient temperature to a first elevated temperature (e.g., Stainless Steel—1500-1550° F.). The time period to ramp up to the first elevated temperature generally depends on the number of stamped metal parts to be heated and hardened and/or the number of stamped metal parts that are stacked on one another, if a plurality of stamped metal parts are stacked together. The stamped metal part is generally maintained in an inert atmosphere (e.g., vacuum, nitrogen atmosphere, etc.) during the ramping of the temperature up to the first elevated temperature so as to control the atmosphere about the stamped metal part and to inhibit or prevent corrosion of the stamped metal part during the heating of the stamped metal part to the first elevated temperature.

Step 4—Ramping up the temperature from the first elevated temperature to a second elevated temperature (e.g., Stainless Steel—1850-1900° F.), and then heating the stamped metal part at such second elevated temperature for a certain time period (e.g., 0.5-1.5 hours). The time period for ramping up the temperature from the first elevated temperature to the second elevated temperature generally depends on the on the number of stamped metal parts to be heated and hardened and/or the number of stamped metal parts that are stacked on one another, if a plurality of stamped metal parts are stacked together. The stamped metal part is generally maintained in an inert atmosphere during the ramping up to the second elevated temperature and the heating at the second elevated temperature so as to control the atmosphere about the stamped metal part and to inhibit or prevent corrosion of the stamped part during the heating of the stamped metal part to the second elevated temperature and while the stamped metal part is maintained at the second elevated temperature; however, this is not required.

Step 5—Cooling the heated stamped metal parts down from the second elevated temperature. Generally, this cooling down step is performed in an inert atmosphere so as to inhibit or prevent corrosion of the stamped part during the cooling step. Generally, the heated stamped metal part is cooled to ambient temperature; however, this is not required. During the cooling step, the heated stamped metal part is generally maintained in a pressurized environment (e.g., 3.5-6 bars). After the stamped metal part has been cooled, the cooled stamped metal part is typically an annealed part having a hardness of about 49-53HRC@400° F. for stainless steel.

After metal blanking process for a pre-hardened, non-heat treated process, or after the stamped metal part has been heat treated and removed from a fixture, if such fixture was used, the stamped metal part is typically subjected to a finishing process. The finishing process generally includes a deburring process. The finishing process is also generally designed to create a conditioned part edge that enhances the fatigue life and performance of the stamped metal part. The removal of sharp edges from the stamped metal part has been found to enhance the fatigue life and performance of the stamped metal part. The finishing process can also be used to create favorable residual compressive stresses on the stamped metal part. The finishing process can also be used to create finished surfaces on the stamped metal part (e.g., 0.25 Rz max.). The finishing process can also be used to create a random matte finish on the stamped metal part to reduce surface imperfections on the stamped metal part.

After the stamped metal part is processed by the finishing process, the stamped metal part is typically subjected to a stress and/or hardening modification process. One non-limiting type of a stress and/or hardening modification process is a peening process. When a peening process is used, one or more portions of the stamped metal part can be masked to as to provide localized peening to the stamped metal part; however, this is not required. When localized peening is used, such localized peening is generally used on the high stress areas of the stamped metal part. The stress and/or hardening modification process is generally used to increase the compressive stress of the stamped metal part (e.g., at least about −120Ksi, etc.) on a portion of the stamped metal part or on the complete stamped metal part. The stress and/or hardening modification process can also be used to relieve tensile stresses in the stamped metal part and/or to encourage strain hardening of the stamped metal part.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

Having thus described the invention, it is claimed:

1. A method for forming a stamped part that includes one or more flexure regions, said method comprising the steps of:
    a) provide a flat metal sheet material having a thickness of no more than about 0.2 inches;
    b) supplying said flat metal sheet material to a metal blanking process to form a stamped metal part, said stamped metal part having a top and bottom surface and an edge, said metal blanking process including a die that is designed to minimize fatigue failure initiations sites in said stamped metal part;
    c) heat treating said stamped metal part, said step of heating treating including
        i) coating said stamped metal part with a material that inhibits bonding of said stamped metal part with adjacently positioned objects,
        ii) heating said stamped metal part to an annealing temperature, and
        iii) cooling said stamped metal part; and,
    d) finishing said stamped metal part, said finishing step includes deburring at least a portion of said edges of said stamped metal part and rounding at least a portion of said edges of said stamped metal part.

2. The method as defined in claim 1, including the step of stress or harden modifying said stamped metal part after said finishing step, said step of stress or harden modifying designed to relieve tensile stresses in said stamped metal part, encourage strain hardening in said stamped metal part, or combinations thereof.

3. The method as defined in claim 1, wherein said stamped metal part after said metal blanking process
    i) a size tolerance within about 3 mm,
    ii) has said top and said bottom surfaces lying in a parallel flat plane to one another and that at least about 90% of said top and bottom surfaces lie in such parallel flat planes, and
    iii) has a maximum amount of bending of relative to a thickness of said stamped metal part of less than about 50%.

4. The method as defined in claim 2, wherein said stamped metal part after said metal blanking process
    i) a size tolerance within about 3 mm,
    ii) has said top and said bottom surfaces lying in a parallel flat plane to one another and that at least about 90% of said top and bottom surfaces lie in such parallel flat planes, and
    iii) has a maximum amount of bending of relative to a thickness of said stamped metal part of less than about 50%.

5. A method for forming a stamped part that includes one or more flexure regions, said method comprising the steps of:
    a) provide a flat metal sheet material having a thickness of no more than about 0.2 inches;
    b) supplying said flat metal sheet material to a metal blanking process to form a stamped metal part, said stamped metal part having a top and bottom surface and an edge, said metal blanking process including a die that is designed to minimize fatigue failure initiations sites in said stamped metal part;
    c) heat treating said stamped metal part prior to a finishing step, said step of heating treating including
        i) coating said stamped metal part with a material that inhibits bonding of said stamped metal part with adjacently positioned objects ii) heating said stamped metal part in a vacuum or inert environment to an annealing temperature, and iii) cooling said stamped metal part in a vacuum or inert environment; and, d) finishing said stamped metal part, said finishing step includes deburring at least a portion of said edges of said stamped metal part and rounding at least a portion of said edges of said stamped metal part, said stamped metal part after finishing having a smoothness of at least about 0.75 Rz max.

6. The method as defined in claim 4, wherein the step of heat treating said stamped metal part occurs prior to said finishing step, said step of heating said stamped metal part occurs in a vacuum or inert environment, and said step of cooling said stamped metal part occurs in a vacuum or inert environment.

7. The method as defined in claim 5, wherein said step of heat treating said metal stamped part includes
1) heating said stamped part in a vacuum or inert environment to a first elevated temperature, said first elevated temperature about 30-90% of an annealing temperature of said stamped metal part,
2) heating said stamped metal part in a vacuum or inert environment to a second elevated temperature, said second elevated temperature an annealing temperature of said stamped metal part,
3) maintaining said stamped metal part at said second elevated temperature for at least about 0.25 hours, and
4) cooling said stamped metal part in a pressurized atmosphere down from said second elevated temperature, said pressurized atmosphere at least about 1.5 bars.

8. The method as defined in claim 6, wherein said step of heat treating said metal stamped part includes
1) heating said stamped part to a first elevated temperature, said first elevated temperature about 30-90% of an annealing temperature of said stamped metal part,
2) heating said stamped metal part to a second elevated temperature, said second elevated temperature an annealing temperature of said stamped metal part,
3) maintaining said stamped metal part at said second elevated temperature for at least about 0.25 hours, and
4) cooling said stamped metal part.

9. The method as defined in claim 5, wherein said coating material includes one or more materials selected from the group consisting of magnesium, magnesium compound, and silicon-oxygen compound.

10. The method as defined in claim 7, wherein said coating material includes one or more materials selected from the group consisting of magnesium, magnesium compound, and silicon-oxygen compound.

11. The method as defined in claim 5, wherein said stamped metal part is placed in a fixture prior to or during said heating of said stamped metal part so as to inhibit or prevent bending or warping of said stamped metal part during said step of heat treating.

12. The method as defined in claim 10, wherein said stamped metal part is placed in a fixture prior to or during said heating of said stamped metal part so as to inhibit or prevent bending or warping of said stamped metal part during said step of heat treating.

13. The method as defined in claim 1, wherein said stamped metal part after said step of finishing said stamped metal part has a hardness of at least about 20HRC@400° F.

14. The method as defined in claim 12, wherein said stamped metal part after said step of finishing said stamped metal part has a hardness of at least about 20HRC@400 (degrees) F.

15. The method as defined in claim 1, wherein said step of finishing results in said stamped metal part having at least about −70 Ksi of residual compressive stresses.

16. The method as defined in claim 14, wherein said step of finishing results in said stamped metal part having at least about −70 Ksi of residual compressive stresses.

17. The method as defined in claim 2, wherein said step of stress or harden modifying said stamped metal part includes a peening process, said peening process including the steps of 1) masking a portion of said stamped metal part, and 2) directing shot to unmasked portions of said stamped metal part to increase compressive stress of said stamped metal part to at least about −110 Ksi.

18. The method as defined in claim 16, wherein said step of stress or harden modifying said stamped metal part includes a peening process, said peening process including the steps of 1) masking a portion of said stamped metal part, and 2) directing shot to unmasked portions of said stamped metal part to increase compressive stress of said stamped metal part to at least about −110 Ksi.

19. A method for forming a stamped spring flexure that includes one or more flexure regions, said method comprising the steps of:
a) provide a flat metal sheet material having a thickness of no more than about 0.1 inches, said metal sheet formed of carbon steel or stainless steel;
b) supplying said flat metal sheet material to a metal blanking process to form a stamped metal part, said stamped metal part having a top and bottom surface and an edge, said metal blanking process including a die that is designed to minimize fatigue failure initiations sites in said stamped metal part, said stamped metal part after said metal blanking process
i) has a size tolerance within about 2 mm,
ii) has said top and said bottom surfaces lying in a parallel flat plane to one another and that at least about 95% of said top and bottom surfaces lie in such parallel flat planes, and
iii) has a maximum amount of bending of relative to a thickness of said stamped metal part of less than about 30%;
c) heat treating said stamped metal part prior to a finishing step, said step of heating treating including
i) coating said stamped metal part with a material that inhibits bonding of said stamped metal part with adjacently positioned objects,
ii) placing said stamped metal part in a fixture prior to or during said heating of said stamped metal part so as to inhibit or prevent bending or warping of said stamped metal part during said step of heat treating,
iii) heating said stamped metal part in a vacuum or inert environment to an annealing temperature, and
iv) cooling said stamped metal part in an inert and pressurized environment, said coating material including one or more materials selected from the group consisting of magnesium, magnesium compound, and silicon-oxygen compound, said pressurized environment at least about 2 bars;
d) finishing said stamped metal part, said finishing step includes deburring at least a portion of said edges of said stamped metal part and rounding at least a portion of said edges of said stamped metal part, said stamped metal part after finishing having a smoothness of at least about 0.5 Rz max, said step of finishing results in said stamped metal part having at least about −90 Ksi of residual compressive stresses, said stamped metal part after said step of finishing having a hardness of at least about 24HRC @400 (degrees) F.; and, e) stress or harden modifying said stamped metal part after said finishing step, said step of stress or harden modifying designed to relieve tensile stresses in said stamped metal part, encourage strain hardening in said stamped metal part, or combinations thereof, said step of stress or harden modifying said stamped metal part including a peening process, said peening process including the steps of i) masking a portion of said stamped metal part, and ii) directing shot to unmasked portions of said stamped metal part to increase compressive stress of said stamped metal part to at least about −115 Ksi.

* * * * *